Patented Jan. 6, 1942

2,269,315

UNITED STATES PATENT OFFICE 2,269,315

PROCESS FOR THE REMOVAL OF METALLIC ELEMENTS FROM WATER

Gussie H. Nelson, Max Levine, and Daniel F. J. Lynch, Ames, Iowa, assignors to Henry A. Wallace, Secretary of Agriculture of the United States of America No Drawing. Application September 8, 1937, Serial No. 162,878

4 Claims. (Cl. 210—23)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

Our invention relates to the use of the residues resulting from the treatment of farm wastes, such as corn cobs, corn stalks, cereal straws, bagasse, etc., and the liquors or other waste products remaining after the utilization of farm products (such, for example, as paper mill and wood mill pulp, cook liquors from wall board manufacture and similar substances), by treatment to precipitate substances to be described henceforth, which substances have the properties of removing iron and manganese and other metallic elements from water.

Heretofore iron and manganese have been removed from water by aeration, aeration together with addition of lime, or otherwise adjusting the reaction of the water, and filtration of the mixture of treated water through sand; or by filtration of the iron or manganese containing water through specially impregnated artificial zeolite, or through beds containing coke or coal or manganese ore or sand impregnated with iron and manganese salts.

Our researches have demonstrated that residues resulting from various treatments of farm wastes have the propertly of combining with iron and manganese in water to produce complexes which can be removed from the water by filtration, or sedimentation.

One method of preparing the active substance from corn cobs consists of boiling the ground corn cobs with 5 percent sulphuric acid for several hours, the mixture then being filtered. The residue is then treated with 2 to 4 percent sodium hydroxide and with steam, up to pressures as high as 50 pounds. This alkali digested material is then filtered and the filtrate acidified with sulphuric acid until the concentration of acid reaches approximately 5 percent. This results in the production of a voluminous precipitate, which is filtered and copiously washed, and dried. This precipitate consists, for the most part, of lignin and lignin-like substances, which constitute the iron removing material. The foregoing method is our preferred method of separation of these lignin-like complexes, but other methods and modifications of this method might be used equally well, as for example, the preliminary hydrolysis with the 5 percent acid might be eliminated, but we prefer to treat first with acid, then with alkali and then again with acid as has been described.

Other farm wastes, such as corn stalks, wheat straw, peanut hulls, flax straw, etc., may be made to yield iron removing substances by the treatment described above.

These lignin and lignin-complexes may be prepared from such wastes as wood saw-dust in a manner similar to that described above, except that the concentration of alkali employed and the temperature of digestion may be raised to 5 percent, or even higher, and the pressure to 60 pounds, respectively.

Sulphite waste from paper pulp plants yield these iron removing constituents upon acidification up to about 5 percent sulphuric acid and boiling for several hours. Cook liquors from wall board manufacturing plants also yield these lignin-like complexes on acidification with sulphuric acid up to 5 percent and boiling for several hours. The preferred acid described above was sulphuric acid, but our findings are that other acids, such as hydrochloric or phosphoric acids, can also be used.

These iron removing lignin and lignin-complex substances may also be prepared from farm wastes by treatment with strong sulphuric acid in a concentration of from 60 to 95 percent and permitting the sulphuric acid to act in the cold, that is, at ordinary temperatures, for periods ranging from 2 to 16 hours, or by bringing the material to a boil and heating for at least two hours. The resulting mixture is diluted to make the concentration of acid equivalent to approximately 4 percent. This diluted material is then boiled for approximately 2 hours and filtered and the precipitate washed free from acid.

We have discovered that the addition of minute quantities of these lignin-like complexes, from .001 of a gram up to .20 of a gram per liter of water containing up to 10 p. p. m. of iron and stirring the mixture for various lengths of time, from fifteen minutes to several hours, and then filtering will yield a filtrate which is entirely or practically free of iron. Similar results may be obtained with manganese.

We have also discovered that by preparing these lignin-like complexes in the form of fine granular material, arranged in the form of filters of various depths, from one to three or more feet, passing the water through this granular material results in the removal of a very substantial portion of the iron and manganese, if the iron and manganese content is high and practically complete removal where the iron content is less than 5 p. p. m.

We have also discovered that by treating these lignin-like substances with alkali of approximately 2 percent strength to bring them into solution, and then adding to this alkali-lignin solution protein complexes, such as alkali casein, and permitting the mixtures to react (either in the cold, or the reaction accelerated by heat), and then acidifying the mixture with sulphuric acid, there results a precipitate consisting of ligno-proteins. This precipitate may be removed by filtration and washed free of acid, and when dried and ground may be used as described above for the removal of iron and manganese from water.

Having thus described our invention, what we claim for Letters Patent is:

1. A process for the removal of iron and other metallic elements from water, which comprises subjecting said iron and other metallic elements to the adsorptive action of lignin, which has been obtained from undecomposed plant materials, in the proportion of substantially 1 milligram of lignin per liter of water having up to 10 parts per million of said iron and other metallic elements; thence stirring the mixture; thence filtering through sand and other suitable filters, and thereby producing a filtrate substantially free from iron and other metallic elements.

2. A process for the removal of iron and other metallic elements from water, which comprises subjecting said iron and other metallic elements to the adsorptive action of lignin, obtained from ligneous farm wastes, in the proportion of substantially 1 milligram of lignin per liter of water having up to 10 parts per million of said iron and other metallic elements; thence stirring the mixture; thence filtering through sand and other suitable filters, and thereby producing a filtrate substantially free from iron and other metallic elements.

3. A process for the removal of iron and other metallic elements from water, which comprises subjecting said iron and other metallic elements to the adsorptive action of lignin, which has been obtained from pulp mill and wallboard plant spent cook liquors, in the proportion of substantially 1 milligram of lignin per liter of water having up to 10 parts per million of said iron and other metallic elements; thence stirring the mixture; thence filtering through sand and other suitable filters, and thereby producing a filtrate substantially free from iron and other metallic elements.

4. A process for the removal of iron and manganese from water, which comprises subjecting iron and manganese to the adsorptive action of lignin, which has been obtained from undecomposed plant materials, in the proportion of substantially 1 milligram of lignin per liter of water having up to 10 parts per million of said iron and other metallic elements; thence stirring the mixture; thence filtering through sand and other suitable filters, and thereby producing a filtrate substantially free from iron and manganese.

GUSSIE H. NELSON.
MAX LEVINE.
DANIEL F. J. LYNCH.